US008746750B2

(12) United States Patent  (10) Patent No.: US 8,746,750 B2
Gilbreath  (45) Date of Patent: Jun. 10, 2014

(54) VARIABLE CURVATURE CLIP FOR QUICK CONNECT COUPLING

(75) Inventor: Donald R. Gilbreath, Castle Rock, CO (US)

(73) Assignee: The Gates Corporation, Denver, CO (US)

(*) Notice: Subject to any disclaimer, the term of this patent is extended or adjusted under 35 U.S.C. 154(b) by 86 days.

(21) Appl. No.: 13/023,232

(22) Filed: Feb. 8, 2011

(65) Prior Publication Data
US 2012/0200080 A1 Aug. 9, 2012

(51) Int. Cl.
F16L 27/00 (2006.01)

(52) U.S. Cl.
USPC .......................... 285/321; 285/276

(58) Field of Classification Search
USPC .......... 285/321, 276; 411/520, 516, 521, 353, 411/518
See application file for complete search history.

(56) References Cited

U.S. PATENT DOCUMENTS

| | | | | |
|---|---|---|---|---|
| 2,250,286 A * | 7/1941 | White | ............................ | 285/321 |
| 2,595,787 A * | 5/1952 | Heimann | ....................... | 285/321 |
| 2,886,355 A * | 5/1959 | Wurzel | ........................... | 285/321 |
| 3,045,265 A * | 7/1962 | Seibert et al. | ................. | 408/234 |
| 3,048,427 A * | 8/1962 | Mahoff et al. | ................ | 285/321 |
| 3,079,188 A * | 2/1963 | Oswold | .......................... | 285/321 |
| 3,129,777 A * | 4/1964 | Haspert | .......................... | 285/321 |
| 3,540,760 A * | 11/1970 | Jeromson, Jr. et al. | ........ | 285/321 |
| 3,992,117 A * | 11/1976 | Ristau | ............................ | 285/321 |
| 4,558,962 A | 12/1985 | Meinlschmidt | | |
| 4,565,392 A * | 1/1986 | Vyse | ............................. | 285/321 |
| 4,640,534 A * | 2/1987 | Hoskins et al. | ............... | 285/321 |
| 4,798,406 A * | 1/1989 | Buller | ........................... | 285/321 |
| 5,176,413 A * | 1/1993 | Westman | ....................... | 285/321 |
| 5,681,060 A * | 10/1997 | Berg et al. | ..................... | 285/321 |
| 5,826,920 A * | 10/1998 | Bartholomew | ............... | 285/321 |
| 5,979,946 A * | 11/1999 | Petersen et al. | ............... | 285/321 |
| 6,019,399 A * | 2/2000 | Sweeney | ....................... | 285/321 |
| 6,045,135 A | 4/2000 | Feistel | | |
| 6,386,596 B1 * | 5/2002 | Olson | ........................... | 285/321 |
| 7,090,061 B2 | 8/2006 | Bove et al. | | |
| 7,364,207 B2 | 4/2008 | McGee et al. | | |
| 7,445,250 B2 | 11/2008 | Swift et al. | | |
| 7,507,063 B2 * | 3/2009 | Dexter et al. | .................. | 411/419 |
| 7,559,555 B2 | 7/2009 | Shimazu et al. | | |
| 2008/0196833 A1 | 8/2008 | Chen et al. | | |

* cited by examiner

Primary Examiner — David E Bochna
(74) Attorney, Agent, or Firm — Paul N. Dunlap, Esq.; Jeffrey A. Thurnau, Esq.

(57) ABSTRACT

A clip for a quick connect hose coupling that possesses an improved combination of characteristics leading to a quick connect coupling that can be connected reliably, consistently, and with reduced damage to the coupling and low insertion force. The clip provides reduced friction against the fitting and reduces insertion force and damage. The clip has two end portions that are designed to be deflected relative to each other when the stem is inserted into the port. The clip further has a periphery with two end portions, each curved at or beyond the radius of maximum installation deflection such that they will not scrape the installation ramp.

20 Claims, 3 Drawing Sheets

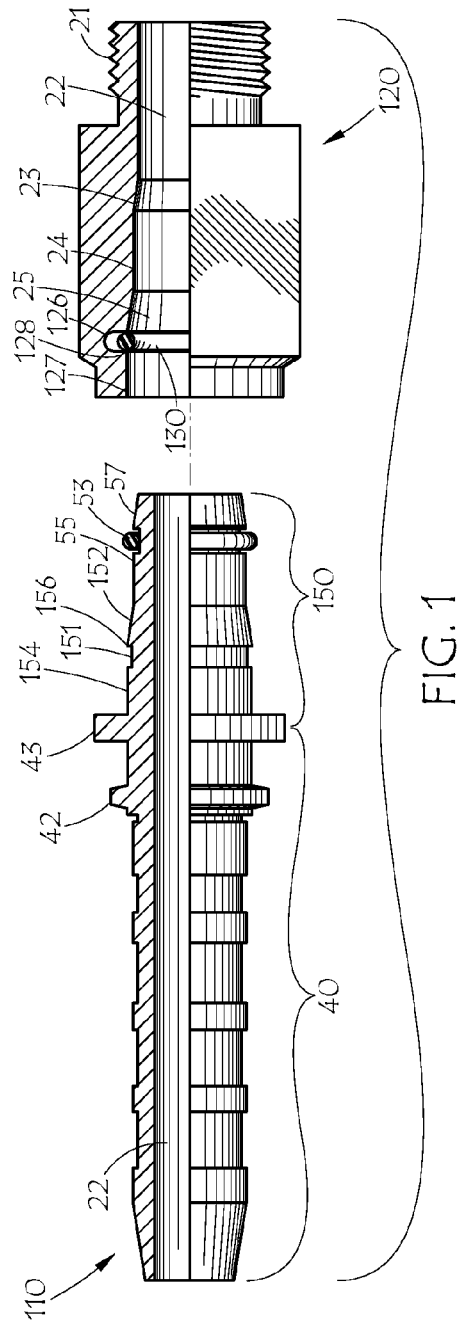
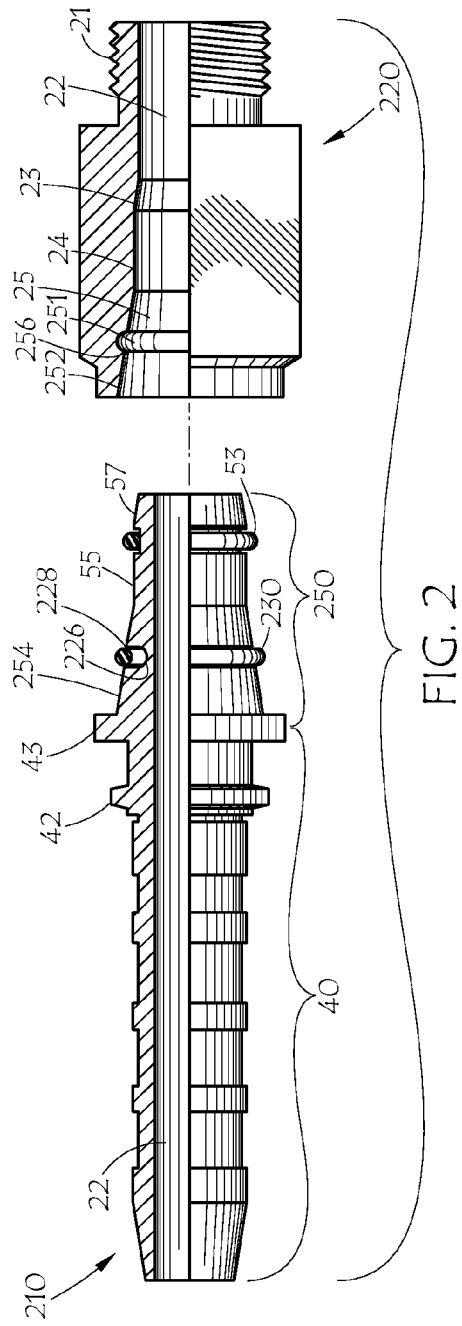

VARIABLE CURVATURE CLIP FOR QUICK CONNECT COUPLING

BACKGROUND OF THE INVENTION

1. Field of the Invention

This invention relates generally to connectors, more particularly to quick connect couplers that utilize a clip for retention purposes, more particularly to wire clips, and specifically to a variable curvature wire clip.

2. Description of the Prior Art

Many quick connect fittings, for example for connecting hose or tubing or hydraulic fittings, utilize a clip to retain a male fitting in a female port. During assembly, because of contact between the port, the clip, and the stem, the clip is deflected either inward or outward and then the clip snaps into place to hold the male fitting in the female port. For a clip that is retained on a male fitting, the clip is deflected inward by a ramp formed in the female port until the clip snaps behind a step in the female port, thereby forming a locking configuration. For a clip that is retained in a female port, the clip is deflected outward via a ramp on the male fitting until the clip snaps into place behind a step on the male fitting, thereby forming a locking configuration.

Traditionally, quick connect clips are round with a gap between the ends. However, during deflection, a round clip substantially departs from its un-deflected round shape. Because of the deflection, the ends of the clips contact the surface of the ramp and can scratch or gouge the surface, thereby increasing the insertion force required to assemble the quick connect fittings and permanently damaging the ramp. Permanent damage to the ramp can result in corrosion issues and an increased necessary insertion force.

The prior art fails to disclose a substantially circular wire clip configured for coupling applications such as quick connect fittings, that reduces undesired clip contact with the fittings, thereby reducing the insertion force required for assembly and preserving the fittings from permanent damage. Accordingly, there is a need for a wire clip configured to reduce undesired clip contact with the associated fittings, thereby reducing insertion force and damage.

SUMMARY

The present invention has as an object the provision of a clip for a quick connect coupling that possesses an improved combination of characteristics leading to a quick connect coupling that can be connected reliably, consistently, with reduced damage to the coupling and low insertion force.

The present invention is directed to a wire clip that provides reduced contact between the ends of the clip and the coupling and reduces insertion force and damage. The clip can also be a stamped clip. The clip has two end portions that are designed to be deflected relative to each other when the stem is inserted into the port. In this instance, the term "port" can refer to an opening that is machined directly into a valve, cylinder, pump, manifold, or other machinery and a female adapter fitting. One clip embodiment has an inner periphery defined by a center portion curved to be smaller than the largest radius of the male ramp and where the two end portions are equal to or greater than the largest radius of the male ramp. Another embodiment has an outer periphery defined by a center portion curved to be larger than the smallest radius of the female ramp and where the two end portions are equal or smaller than the smallest radius of the female ramp. Such clips may have a continuously varying curvature, such as a shape defined via beam deflection equations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 1 is an elevation view with one quarter cut-away of the stem and port of an embodiment of the invention;

FIG. 2 is an elevation view with one quarter cut-away of the port and stem of an embodiment of the invention;

DETAILED DESCRIPTION

Figure 4:
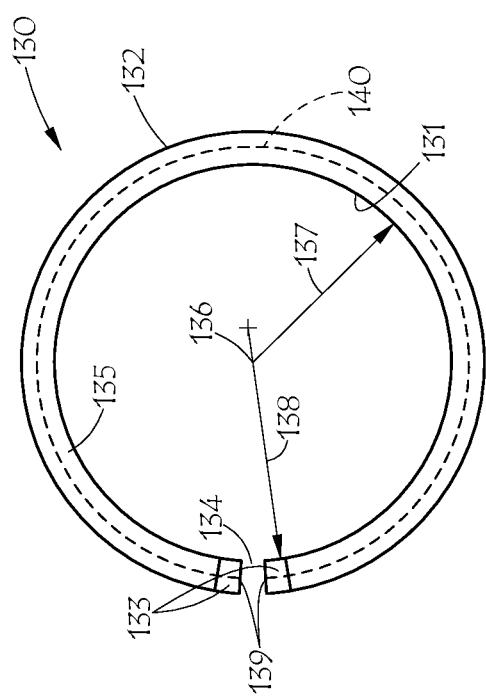
FIG. 4 depicts the clip of the invention of FIG. 1 wherein the clip is initially housed in the port.

Couplings typically possess a male connector and a female connector and may be held together by a clip. The present invention is directed to a clip for a quick connect coupling that provides reduced contact between the ends of the clip and the coupling and reduces insertion force and damage. For the purposes of clarity in this discussion, the male connector shall be referred to as a stem while the female connector shall be referred to as the port. Thus, the stem as referred to herein can be any type of male connector and the port as referred to herein can be any type of female connector. Referring to FIG. 1, an embodiment of the quick connect coupling, more particularly, stem 110 and port 120 of a quick connect coupling is shown. Stem 110 has male connection portion 150 and attachment portion 40. The attachment portion can be any kind of attachment suitable for connection to a hose, tube, pipe, block or other fitting. For example, the attachment portion can be a hose barb, threaded fitting, weld, flange, or the like. To discuss the elements of the connector, we shall proceed from the attachment portion 40 to the male connection portion 150. The attachment portion 40 extends leftward to attach to an associated hose, pipe, or fitting (not shown). The mid-portion of stem 110 may include various optional features such as stop 42 and/or flange 43 and/or wrench mating flats and the like. Male connection portion 150 may include cylindrical portions 55 and 154 and chamfers or ramps such as clip expansion ramp 152 and chamfer 57. Other optional features include seals, such as seal 53 set in a groove cut in cylindrical portion 55. Associated port 120 is illustrated as part of an adapter or fitting having threaded attachment portion 21, as one contemplated embodiment and for convenience of illustration. As with the attachment portion of the stem, the port attachment portion 21 extends to the right and may be threaded, or be a barb, weld, flange, or any suitable fitting. Alternately, port 120 may be machined into the body of or integral with a fixture, machine or equipment not depicted but understood to one of skill in the art. Port 120 has an interior surface defining an adapter bore 22, a forward cylinder 24, a seal compression ramp 25, a transition ramp 23, an internal port retaining groove 126 with retaining groove edge 128, clip 130, and a rear cylinder 127. The various ramps, grooves, seal and cylindrical portions on the stem are adapted to cooperate with corresponding portions of the port and with the clip in the port. Clip 130, according to an embodiment of the invention as illustrated in FIG. 4, has inner periphery 131 defined by center portion 135 curved to be smaller than the largest radius of male ramp 152 and where two end portions 133 are equal to or greater than the largest radius of male ramp 152. Upon insertion of male connection portion 150 of stem 110 into port 120, clip 130 is expanded by clip expansion ramp 152 into retaining groove 126, which is cut deep enough into the port for this purpose, and o-ring seal 53 is compressed by seal compression ramp 25. Then, clip 130 snaps over retaining step 156 into recess 151, while seal 53 resides against forward cylinder 24. Removal of the stem from the port is thus inhibited by the clip being mechanically entrapped between retaining step 156 and retaining groove edge 128. The increased radius of the clip end portions prevents damage to the male expansion ramp.

The coupling may also be of a type described in U.S. Pat. No. 7,364,207, the specification of which is hereby incorporated herein by reference. In an embodiment shown in U.S. Pat. No. 7,364,207, ramps 25 and 152 are replaced by a combination of a leading ramp, a following ramp and a transition surface intermediate there between. Herein, a ramp is defined as a region of gradually increasing or decreasing diameter that can be curved, non-linear or frustoconical/conical/linear in design. Different ramp designs will provide different insertion force profiles. For example, steeper ramp sections will require higher insertion force.

Figure 5:
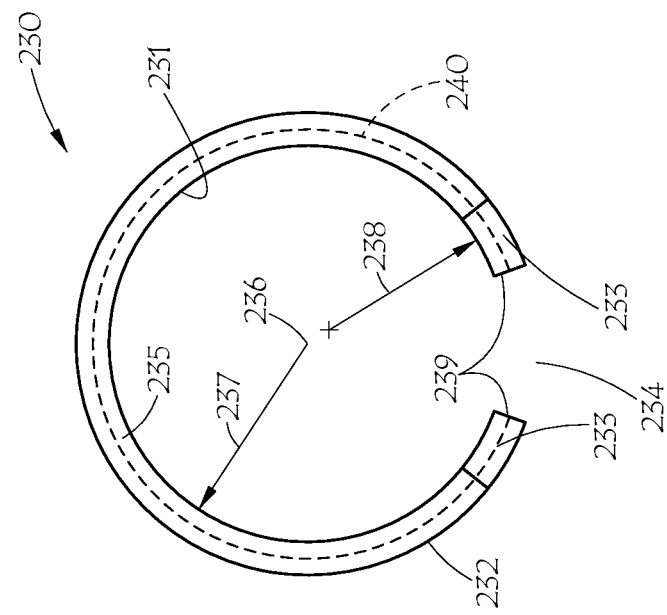
FIG. 5 depicts a clip of the invention of FIG. 2 wherein the clip is initially housed on the stem.

FIG. 2 shows a second embodiment of the quick connect coupling in the form of stem 210 and port 220. Stem 210 has male connection portion 250 and attachment portion 40. The attachment portion can be any kind of attachment suitable for connection to a hose, tube, pipe, block or other fitting. For example, the attachment portion can be a barb, a threaded fitting, weld, flange, or the like. To discuss the elements of the connector, we shall proceed from the attachment portion 40 to the male connection portion 250. The attachment portion 40 extends leftward to an associated hose, pipe, or fitting (not shown). The mid-portion of stem 210 may include various optional features such as stop 42 and/or flange 43. Male connection portion 250 may include features as needed, such as cylindrical portion 55 and chamfer 57 and ramp 254. Other optional features include seals, such as seal 53 set in a groove cut in cylindrical portion 55. In this embodiment, male connection portion 250 of stem 210 includes clip retaining groove 226 with retaining groove edge 228 and clip 230 housed therein. Associated port 220 is illustrated as part of an adapter having threaded attachment portion 21. As with the attachment portion of the stem, the port attachment portion 21 extends to the right and may instead of threaded be a barb, weld, flange, or any suitable fitting. Alternately, port 220 may be machined into the body of or integral with a fixture, machine or equipment not depicted but understood to one of skill in the art. Port 220 has an interior surface defining an adapter bore 22, a forward cylinder 24, a seal compression ramp 25, a transition ramp 23, an internal recess 251 with clip retaining step 256, and clip compression ramp 252. The various ramps, grooves, seal and cylindrical portions in the port are adapted to cooperate with corresponding portions and the clip on the stem. Clip 230, according to an embodiment of the invention as illustrated in FIG. 5, has outer periphery 232 defined by a center portion 235 curved to be larger than the smallest radius of female ramp 252 and where two end portions 233 are equal or smaller than the smallest radius of female ramp 252. Upon insertion of male connection portion 250 of stem 210 into port 220, clip 230 is compressed by clip compression ramp 252 into retaining groove 226, which is cut deep enough into the stem for this purpose, and seal 53 is compressed by seal compression ramp 25. Then, clip 230 snaps over retaining step 256 into recess 251, while seal 53 resides against forward cylinder 24. Removal of the stem from the port is thus inhibited by the clip being mechanically entrapped between retaining step 256 and retaining groove edge 228. The decreased radius of the clip end portions prevents damage to the female compression ramp.

The coupling may also be of a type described in U.S. Pat. No. 7,445,250, the specification of which are hereby incorporated herein by reference. In an embodiment shown in U.S. Pat. No. 7,445,250, the port includes a recess in the position of recess 251 which has a dual function frustoconical portion adapted to compress the seal during joinder of the male portion with the female portion as well as to compress the clip into groove 226 in preparation for separating the male portion from the female portion. The embodiment of FIG. 7, to be discussed in greater detail below, employs a similar recess.

Figure 3:
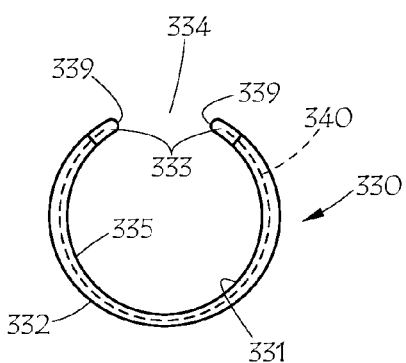
FIG. 3 is a view of a clip pertaining to an embodiment of the invention.

FIGS. 3, 4, and 5 show various embodiments of the clip according to the invention. As depicted in FIG. 3, clip 330 is a locking element for a coupling in the general form of a snap-ring having a gap 334 between two ends 339, which are rounded to reduce scratching or other interference with the coupling parts. Gap 334 need not be any particular size. Clip 330 generally possesses center portion 335, inner periphery 331, outer periphery 332 and two end portions 333, as shown in FIG. 3. In its unstressed condition, center portion 335 of the clip 330 is substantially circular, both in terms of its inner periphery 331 and outer periphery 332. The curvatures of end portions 333 are modified so that the inner periphery of end portions 333 is curved larger than the center portion and/or the outer periphery of end portions 333 is curved smaller than the center portion. In this way, a fitting passing through and expanding the inside of the clip, and/or a fitting passing over and compressing the outside of the clip, will not experience gouging, scratching, or other damaging interference from the end portions or ends of the clip.

Generally speaking, the clip of the present invention can be a wire or stamped snap ring. The clip of the invention generally possesses a center portion, 135, 235, 335, an inner periphery 131, 231, 331, and an outer periphery 132, 232, 332, as shown in FIGS. 4, 5 and 3, respectively. In its unstressed condition, the center portion 135, 235, or 335 of the clip 130, 230, or 330 of the invention is substantially circular. The cross section of the clip 133, 233, or 333 can be uniform. Further, the cross section of the clip 133, 233, or 333 is preferably round. However, the cross section could have any shape, such as rectangular or square. If the cross section has square or sharp edges, the edges of the clip should preferably be eased, beveled, or rounded.

In addition, the clip has two end portions 133, 233, 333 that form a gap 134, 234, 334, again as shown respectively in FIGS. 4, 5 and 3. In order to prevent damage to the fittings, the ends 139, 239, 339 of a clip are typically deburred. If the clip is made according to the invention, the ends 139, 239, 339 of the clip may not need to be deburred and can be left in a more natural state. This can reduce manufacturing costs associated with the clip. The end portions 133, 233, 333 are designed to be deflected relative to each other when the stem is inserted into the port. The clip further has a periphery with two end portions 133, 233, 333, each curved at or beyond the radius of maximum installation deflection such that they will not scrape the installation ramp. The clip 130, 230 or 330 should have no protrusions on the end portions 133, 233, 333, which would prevent usage in between the stem and port of a coupling. The two end portions 133, 233, or 333 of the clip can be equal in length but do not have to be equal in length. The center curve 140, 240, 340 (or "centerline" as used here and in the claims), which follows the curvature of the clip in the middle of the wire or stamping from one end 139, 239, 339 around to the other end, has no inflection points as shown in FIGS. 3, 4, and 5.

The clip 130, 230 or 330 can be manufactured in any way known to those of skill in the art, including through the use of a standard clip machine followed by a secondary operation to vary the radius of the periphery according to the present invention. A spring machine could also be used to form the clip. The clip can be made of any durable metal material, including but not limited to carbon spring steel, music wire, stainless steel, brass, copper, beryllium copper, or phosphor bronze.

Figure 6:
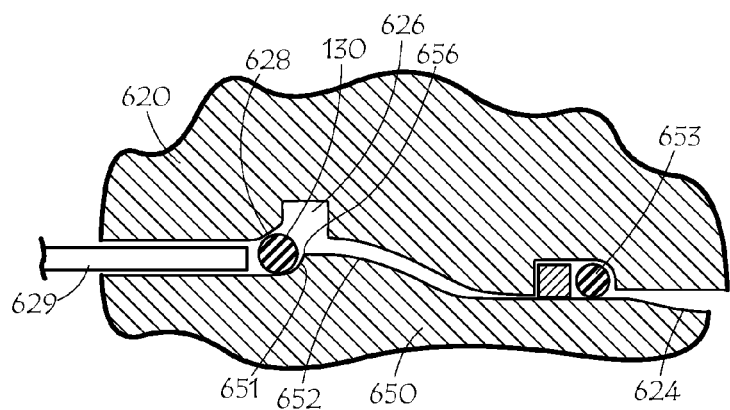
FIG. 6 depicts the locking mechanism of a coupling of the invention utilizing the clip of FIG. 4.
Figure 7:
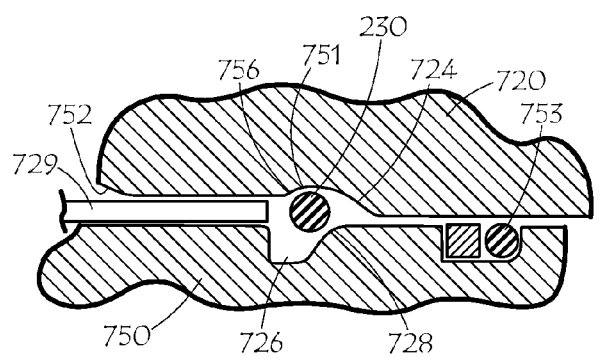
FIG. 7 depicts the locking mechanism of a coupling of the invention utilizing the clip of FIG. 5.

FIG. 4 shows end portions 139 of the clip formed outward with greater radius than central portion 135. Thus, the radius 138 of the clip near the end portions 133 is larger than the radius 137 from center 136 of the clip 130 to any other portion of central portion 135 of clip 130. FIG. 6 depicts an assembled port and stem that corresponds to the clip depicted in FIG. 4 wherein clip 130 is housed originally in port 620. The coupling embodiment of FIG. 6 corresponds generally to the embodiment of FIG. 1 and uses the same clip 130, but with some differences in coupling details. Clip 130 is initially housed in retaining groove 626, and expands further into the retaining groove 626 during assembly, and locks into place between step 651 and trapping feature 628, once the stem 650 and port 620 are joined as shown in FIG. 6. The center portion 135 of clip 130 has an inner periphery 131 with an undeformed radius smaller than the largest radius of the clip expansion ramp 652 while the end portions 133 of the inner periphery 131 have a radius equal to or greater than the largest radius of the clip expansion ramp 652. Release mechanism 629 is used to expand clip 130 and push clip 130 into retaining groove 626 where it will not interfere with step 651 as stem 650 is removed from port 620. Clip 130 is formed with an unstressed radius sized so that its outer periphery 132 has a radius less than the radius of the retaining groove 626 and its inner periphery 131 has a radius smaller than the radius of the retaining step 651 for a clip that expands via a male ramp and snaps into place. For the purposes of this disclosure, the clip radius refers to the radius of the clip and not to the cross-sectional radius of the wire. The end portions 133 of the clip 130, however, have a radius greater than or equal to the largest radius of ramp 652. Consequently, clip 130 is trapped or housed within retaining groove 626 prior to assembly, but snaps over edge 656 into retaining step 651 upon assembly of stem 610. In addition, the outer periphery 132 has two end portions 133 that are curved to be equal to or greater in radius than the radius at the edge 656 of retaining step 651. In another embodiment, the end portions of clip 130 shown in FIG. 4 could be straight. In another embodiment, the radius of the clip shown in FIG. 4 could vary throughout various points of the clip, for example making for a smooth transition from center portion to end portions. In FIGS. 4 and 6, the retaining groove 626 has a radius that is equal to or greater than the outer periphery 132 of the clip 130. For the purposes of this disclosure, the retaining groove radius refers to the circumference of the port and not to the cross-sectional radius of the groove. Additionally, the cross-section of retaining groove 626 could be non-round or square-topped or other shape that has a width equal to or greater than the thickness of the clip 130. As shown in FIG. 6, during assembly, the ramp 652 engages clip 130 and radially expands the clip 130 from its unstressed condition into the retaining step or recess 651. As the stem 650 is inserted into the port 620, the retaining step 651 moves into a position under clip 130 such that the clip 130 snaps into position and bridges the gap between the retaining groove 626 and the retaining step 651. Additionally, clip 130 is held in position by trapping feature 628, which could be just the edge of a groove, or a shaped edge for increasing the holding power of the clip as shown in FIG. 6. When clip 130 is in the locked or bridged position after insertion, the stem 650 is mechanically locked in position within the port 620. Upon insertion, the clip 130 and the seal 653 are engaged with the port 620 and stem 650, creating a mechanical entrapment of the clip and sealing the coupling. The seal 653 can be a single o-ring seal or any other type of seal. Further, the seal 653 can be an o-ring seal in combination another element, such as seal backing, to form a seal pack such as illustrated in FIG. 6. The seal can be housed in the port as shown in FIG. 6 or in the stem as shown in FIGS. 1, 2 and 7. Multiple seals may be used.

During assembly of the coupling, end portions 133 of clip 130 will be deflected outward. In order to allow clip 130 to expand as ramp 652 is pressed into the assembled position, the depth of the retaining groove 626 may be proportioned to be at least as great as the diameter of the clip 130. Completion of the assembly is accomplished thereafter by merely pressing hose stem 650 to its assembled position in which it is locked within port 620 by operation of clip 130. The configuration of the retaining groove and retaining step are complementary, but not necessarily symmetric, in this embodiment; the retaining groove being female and the retaining step being male, such that the depth of retaining step 651 may be approximately half of the cross-section of the clip while the depth of retaining groove 626 may be approximately the full cross-section of the clip. The trapping feature 628 may include a shallower step, groove and/or a ramp that may be used to deflect or hold the clip. In another embodiment, the shallower step may be a groove or a depression having two shoulders behind which the clip snaps. Likewise, edge 656 of retaining step 651 may include a suitable shape for better holding or guiding the clip. The end portions 133 of the clip 130, according to one or more embodiments of the invention, have a radius which is at or beyond the radius to which the end portions 133 are deflected upon assembly. The end portions do not then dig into any of the retaining groove 626, ramp 652 and retaining step 651.

FIG. 5 shows an embodiment of a clip with end portions 233 of clip 230 formed inward and, as such, radius 238 of end portions 233 is smaller than the radius 237 from the center 236 of the clip to any other portion of central portion 235 of clip 230. FIG. 7 depicts an assembled port 720 and stem 750 that corresponds to the clip depicted in FIG. 5 wherein clip 230 is originally housed in the stem 750. The coupling embodiment of FIG. 7 corresponds generally to the embodiment of FIG. 2 and uses the same clip 230, but with some differences in coupling details. Clip 230 is initially housed or retained in retaining groove 726, and is compressed by ramp 752 further into retaining groove 726 during assembly, and locks into place between step 756 and trapping feature 728, once stem 750 and port 720 are joined as shown in FIG. 7. Clip 230 is formed with an unstressed radius of central portion 235 sized so that its outer periphery 232 has a radius greater than the radii of the compression ramp 752, and its inner periphery 231 has a radius smaller than the radius of the stem 750 in the vicinity of retaining groove 726. Thus, clip 230 will contract via clip compression ramp 752 and snap into place in recess 751 in port 720, being trapped between edge or step 756 of recess 751 and trapping feature 728. Again, the clip radius refers to the radius of the clip and not to the cross-sectional radius of the wire. The end portions 233 of clip 230, however, have a radius less than or equal to the largest radius of ramp 752. Consequently, clip 230 is trapped within retaining groove 726 prior to assembly, but snaps into retaining step 751 upon assembly of stem 710, without ends 239 digging into ramp 752 or step 756. In yet another embodiment, the radius of clip 230 could vary throughout various points of the clip, for example making for a smooth transition from center portion to end portions. Thus, the outer periphery 232 of the clip, generally, is greater than the radius of the smallest portion of the female compression ramp 752 in the port, while the radius of the end portions 233 of the outer periphery 232 is generally equal to or less then the smallest radius of female ramp 752. As shown in FIG. 7, seal compression ramp 725 may also act as an assist in releasing or disengaging the stem 750 and the port 720, through the release mechanism 729. Thus, sliding port 720 to the left relative to stem 750 may cause seal compression ramp 724 to compress clip 230 back into retaining groove 726. Then sliding release mechanism 729 to the right can trap or retain clip 230 in groove 726 as stem 750 is removed leftward from port 720.

The clip 230 may be held in position by a trapping feature 728 which may be for example a shoulder, step or profile formed in the edge of groove 726. Upon insertion, seal 753 engages port 720 and stem 720, sealing the coupling. Seal 753 can be a single o-ring seal or any other type of seal. Further, seal 753 can be an o-ring seal in combination with packing or another element to form a seal pack. The seal can be housed in the stem as shown in FIG. 7 or in the port as shown in FIG. 6. Multiple seals may be used.

During assembly of the coupling, end portions 233 of clip 230 will be deflected inward. In order to allow clip 230 to contract as it is pressed into ramp 752 toward the assembled position, the depth of the retaining groove 726 may be proportioned to be at least as great as the diameter of the clip 230. Completion of the assembly is accomplished thereafter by merely pressing hose stem 750 to its assembled position in which it is locked within port 720 by operation of clip 230. The configuration of retaining groove 726 and recess 751 with its leading edge 756 are complementary, but not symmetric; the retaining groove being male and the recess being female, such that the depth of recess 751 in port 720 may be approximately half of the cross-section of the clip while the depth of retaining groove 726 may be approximately the full cross-section of the clip. The trapping feature 728 and/or step 756 into recess 751 may also include a suitable shape for better holding or guiding the clip as discussed above for trapping feature 628 and retaining step 651, respectively. The end portions 233 of the clip 230, according to one or more embodiments of the invention, have a radius, which is at or less than the radius to which the end portions 233 are deflected upon assembly. The end portions do not then dig into either the ramp 752, recess 751, or retaining step 756.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A coupling comprising a mating male connector and female connector, and a clip for retaining said two mating connectors, said clip retained in a groove in the female connector, the male connector having a male ramp for expanding the clip during assembly and a retaining step for receiving the clip after expansion by the ramp, the clip comprising:
   an inner periphery having a center portion curved to be smaller than the largest radius of the male ramp; and two end portions each curved to be equal to or greater than the largest radius of the male ramp such that the end portions of the clip are deflected relative to each other when the two connectors are connected and the clip is mechanically entrapped between the connectors; and a centerline with no inflection points.

2. The coupling of claim 1, wherein the clip comprises a uniform cross-section.

3. The coupling of claim 1, wherein the clip comprises a round cross-section.

4. The coupling of claim 1, wherein the clip comprises a wire snap ring.

5. The coupling of claim 1, wherein the clip comprises a stamped snap ring.

6. The coupling of claim 1, wherein the clip comprises carbon spring steel, music wire, stainless steel, brass, copper, beryllium copper, or phosphor bronze.

7. The coupling of claim 1, wherein each said end portion has a form that is defined by a straight line.

8. The coupling of claim 1, wherein each said end portion has a form that is defined by a radius.

9. The coupling according to claim 1, wherein the clip comprises a uniform round cross-section.

10. The coupling according to claim 1, wherein the clip is a wire or stamped snap ring having no protrusions on the end portions.

11. The coupling of claim 1, wherein the radius of the periphery varies continuously.

12. A coupling comprising a mating male connector and a female connector, and a clip for retaining said two mating connectors, said clip retained in a groove in the male connector, the port having a female ramp for compressing the clip during connection and a retaining step for receiving the clip after compression by the ramp, the clip comprising:

an outer periphery having a center portion curved to be larger than the smallest radius of the female ramp; and two end portions each curved to be equal to or smaller than the smallest radius of the female ramp; such that the end portions of the clip are deflected relative to each other when the two connectors are connected and the clip is mechanically entrapped between the connectors;

wherein the clip comprises a uniform cross-section; and a centerline with no inflection points.

13. The coupling of claim 12, wherein the clip comprises a uniform cross-section.

14. The coupling of claim 12, wherein the clip comprises a round cross-section.

15. The coupling of claim 12, wherein the clip comprises a wire snap ring.

16. The coupling of claim 12, wherein the clip comprises a stamped snap ring.

17. The coupling of claim 12, wherein the clip comprises carbon spring steel, music wire, stainless steel, brass, copper, beryllium copper, or phosphor bronze.

18. The coupling according to claim 12, wherein the clip comprises a uniform round cross-section.

19. The coupling according to claim 12, wherein the clip is a wire or stamped snap ring.

20. The coupling of claim 12, wherein the radius of the periphery varies continuously.

* * * * *